United States Patent
Hong et al.

(10) Patent No.: US 11,736,280 B2
(45) Date of Patent: Aug. 22, 2023

(54) QUANTUM ENTITY AUTHENTICATION APPARATUS AND METHOD

(71) Applicant: ELECTRONICS AND TELECOMMUNICATIONS RESEARCH INSTITUTE, Daejeon (KR)

(72) Inventors: Changho Hong, Daejeon (KR); Nayoung Kim, Daejeon (KR); Osung Kwon, Daejeon (KR); Younchang Jeong, Daejeon (KR); Se Wan Ji, Daejeon (KR); Eun Ji Kim, Daejeon (KR); Seok Kim, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 574 days.

(21) Appl. No.: 16/887,170

(22) Filed: May 29, 2020

(65) Prior Publication Data
US 2021/0266157 A1    Aug. 26, 2021

(30) Foreign Application Priority Data
Feb. 24, 2020    (KR) .................. 10-2020-0022326

(51) Int. Cl.
*H04L 9/08*    (2006.01)
*H04B 10/70*    (2013.01)

(52) U.S. Cl.
CPC ............ *H04L 9/0852* (2013.01); *H04B 10/70* (2013.01); *H04L 9/0819* (2013.01)

(58) Field of Classification Search
USPC ........ 380/256, 255, 264, 276; 726/2, 21, 36; 713/150, 163, 181
See application file for complete search history.

(56) References Cited

U.S. PATENT DOCUMENTS 5,764,765 A * 6/1998 Phoenix ................ H04L 9/0858
380/256
5,915,025 A * 6/1999 Taguchi ................ G06F 12/145
380/46

(Continued)

FOREIGN PATENT DOCUMENTS

KR    10-2028098 B1    10/2019

OTHER PUBLICATIONS

Hoi-Kwong Lo et al., "Measurement-device-independent quantum key distribution," Phys. Rev. Lett. 108, 130503 (2012).

(Continued)

*Primary Examiner* — Sharif E Ullah
(74) *Attorney, Agent, or Firm* — LRK Patent Law Firm

(57) ABSTRACT

A quantum entity authentication apparatus and method. The quantum entity authentication apparatus includes a quantum state preparation unit for preparing an authentication quantum state that is generated based on an authentication key previously shared with an entity, a quantum channel verification unit for transmitting a quantum state, generated by performing an operation using a prestored unique operator on the authentication quantum state, to a quantum measurement device, and for verifying security of a quantum channel by using a result of Bell measurement and the authentication quantum state, the result of Bell measurement being revealed by the quantum measurement device for the quantum state, and a quantum entity authentication unit for, when (Continued)

the security of the quantum channel is verified, authenticating the entity using the result of the Bell measurement and the unique operator.

17 Claims, 6 Drawing Sheets

(56) References Cited

U.S. PATENT DOCUMENTS

| | | | | |
|---|---|---|---|---|
| 6,748,083 | B2* | 6/2004 | Hughes | H04L 9/0858 380/278 |
| 7,171,557 | B2* | 1/2007 | Kallahalla | H04L 9/0891 713/165 |
| 7,437,081 | B2* | 10/2008 | Mitchell | H04B 10/70 398/154 |
| 7,778,976 | B2* | 8/2010 | D'Souza | G06F 16/283 707/665 |
| 8,539,586 | B2* | 9/2013 | Stephenson | G06Q 10/06 726/1 |
| 8,811,613 | B2* | 8/2014 | Teruyama | H04L 9/0841 380/255 |
| 8,855,316 | B2* | 10/2014 | Wiseman | H04L 9/0855 380/278 |
| 9,591,027 | B2* | 3/2017 | Molloy | G06F 16/24578 |
| 9,614,668 | B1* | 4/2017 | Simmons | G06F 21/72 |
| 9,673,977 | B1* | 6/2017 | Kalach | H04L 9/0816 |
| 9,749,297 | B2* | 8/2017 | Gvili | H04L 63/061 |
| 9,876,813 | B2* | 1/2018 | Harutyunyan | H04L 63/1433 |
| 9,900,333 | B2* | 2/2018 | Thakar | H04L 63/1433 |
| 9,942,039 | B1* | 4/2018 | Gutoski | G06F 5/00 |
| 9,960,465 | B2* | 5/2018 | Dudley | H01M 50/204 |
| 10,003,457 | B2* | 6/2018 | Hammon | G06F 7/588 |
| 10,057,058 | B2* | 8/2018 | Murakami | H04L 9/0858 |
| 10,089,489 | B2* | 10/2018 | Goldfarb | G06F 16/27 |
| 10,104,101 | B1* | 10/2018 | Thakar | G06F 21/53 |
| 10,116,443 | B1* | 10/2018 | Kalach | H04L 9/0841 |
| 10,185,924 | B1* | 1/2019 | McClintock | H04L 63/1433 |
| 2005/0138352 | A1* | 6/2005 | Gauvreau | H04L 9/3247 713/153 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0143851 | A1* | 6/2007 | Nicodemus | H04L 63/1433 726/4 |
| 2007/0195774 | A1* | 8/2007 | Sherman | H04L 69/16 370/392 |
| 2009/0228316 | A1* | 9/2009 | Foley | G06Q 10/0635 705/7.28 |
| 2010/0175106 | A1* | 7/2010 | Diebier | H04L 67/125 726/1 |
| 2010/0175134 | A1* | 7/2010 | Ali-Ahmad | H04L 63/1433 726/25 |
| 2010/0175135 | A1* | 7/2010 | Kandek | H04L 63/1408 709/224 |
| 2010/0239250 | A1* | 9/2010 | Gisin | H04L 9/0858 380/256 |
| 2011/0206204 | A1* | 8/2011 | Sychev | H04J 14/0273 380/256 |
| 2011/0213979 | A1* | 9/2011 | Wiseman | H04L 9/0844 713/171 |
| 2012/0158725 | A1* | 6/2012 | Molloy | G06F 16/254 707/E17.046 |
| 2013/0263206 | A1* | 10/2013 | Nefedov | G06F 21/604 726/1 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2014/0137228 | A1* | 5/2014 | Shema | H04L 67/02 726/25 |
| 2014/0268245 | A1* | 9/2014 | Kawach | H04N 1/00244 358/403 |
| 2016/0191173 | A1* | 6/2016 | Malaney | H04L 9/0852 455/899 |
| 2016/0234009 | A1* | 8/2016 | Li | H04L 9/0852 |
| 2016/0241396 | A1* | 8/2016 | Fu | H04L 9/0836 |
| 2016/0315768 | A1* | 10/2016 | Fu | H04L 63/0853 |
| 2016/0330219 | A1* | 11/2016 | Hasan | G06N 5/025 |
| 2016/0359626 | A1* | 12/2016 | Fu | H04L 9/0858 |
| 2016/0366094 | A1* | 12/2016 | Mason | H04L 61/5038 |
| 2017/0054556 | A1* | 2/2017 | Fu | H04W 12/06 |
| 2017/0104590 | A1* | 4/2017 | Wang | H03M 13/05 |
| 2017/0155628 | A1* | 6/2017 | Rohloff | H04L 63/02 |
| 2017/0173262 | A1* | 6/2017 | Veltz | G16H 20/17 |
| 2017/0214525 | A1* | 7/2017 | Zhao | H04W 12/0431 |
| 2017/0230173 | A1* | 8/2017 | Choi | H04L 9/12 |
| 2017/0250796 | A1* | 8/2017 | Samid | H04L 9/0838 |
| 2017/0324554 | A1* | 11/2017 | Tomlinson | H04L 9/0838 |
| 2017/0346627 | A1* | 11/2017 | Alleau | H04L 9/0858 |
| 2017/0353302 | A1* | 12/2017 | Fernandez | H04L 1/0075 |
| 2018/0034804 | A1* | 2/2018 | Steiner | H04L 9/3247 |
| 2018/0046766 | A1* | 2/2018 | Deonarine | H04L 9/0643 |
| 2018/0062836 | A1* | 3/2018 | Tanizawa | H04L 9/0852 |
| 2018/0176015 | A1* | 6/2018 | Wang | H04L 9/0825 |
| 2018/0176091 | A1* | 6/2018 | Yoon | H04L 43/0888 |
| 2018/0295114 | A1* | 10/2018 | Abdalla | H04L 9/0844 |
| 2018/0316492 | A1* | 11/2018 | Ramachandran | H04L 9/085 |
| 2018/0337899 | A1* | 11/2018 | Becker | H04L 9/14 |
| 2018/0357934 | A1* | 12/2018 | Smith | G02F 1/1313 |
| 2019/0014126 | A1* | 1/2019 | Sherkin | H04L 12/1886 |
| 2019/0036821 | A1* | 1/2019 | Levy | G06F 12/0868 |
| 2019/0149327 | A1* | 5/2019 | Yuan | H04L 9/0852 380/255 |
| 2019/0166128 | A1* | 5/2019 | Kurian | H04L 63/145 |
| 2019/0238326 | A1* | 8/2019 | Ji | H04L 9/0861 |
| 2019/0319804 | A1* | 10/2019 | Mathew | G09C 1/00 |
| 2019/0349392 | A1* | 11/2019 | Wetterwald | H04L 43/0852 |
| 2020/0084030 | A1* | 3/2020 | Nendell | H04L 9/0861 |
| 2020/0084222 | A1* | 3/2020 | William | H04L 9/3242 |
| 2020/0106606 | A1* | 4/2020 | Pontaza Rodas | H04L 9/3093 |
| 2020/0184017 | A1* | 6/2020 | Batra | G06N 5/01 |
| 2020/0320543 | A1* | 10/2020 | Carter | G06Q 30/018 |
| 2020/0328886 | A1* | 10/2020 | Newton | H04L 9/0858 |
| 2020/0351086 | A1* | 11/2020 | Walenta | H04L 9/083 |
| 2021/0083864 | A1* | 3/2021 | Bush | H04L 9/088 |
| 2022/0006627 | A1* | 1/2022 | Ko | H04L 9/14 |
| 2022/0353071 | A1* | 11/2022 | Jeong | G06N 10/60 |

OTHER PUBLICATIONS

Piotr Zawadzki, "Quantum identity authentication without entanglement," Quantum Information Processing (2019) 18:7.

Ji-Woong Choi et al., "Measurement-Device-Independent Quantum Key Distribution," Information and Communications Magazine, KICS, vol. 36, No. 08, pp. 11-18 (2019.).

Kang, Min-Sung et al., "Controlled mutual quantum entity authentication with an untrusted third party," Quantum Information Processing 17.7, 159(2018.).

Kim, Yong-Su et al., "Informationally symmetrical Bell state preparation and measurement," Optics express 26.22, 29539-29549 (2018.).

* cited by examiner

QUANTUM ENTITY AUTHENTICATION APPARATUS AND METHOD

CROSS REFERENCE TO RELATED APPLICATION

This application claims the benefit of Korean Patent Application No. 10-2020-0022326, filed Feb. 24, 2020, which is hereby incorporated by reference in its entirety into this application.

BACKGROUND OF THE INVENTION

1. Technical Field

The present invention relates generally to quantum entity authentication technology, and more particularly, to measurement-device-independent quantum entity authentication technology.

2. Description of Related Art

It has been proven that, of quantum cryptography communication techniques, a Quantum Key Distribution (QKD) technique theoretically provides unconditional security regardless of computability of an attacker. However, in spite of the QKD technique, the security of which has been proven, there is the possibility that theoretical unconditional security will be damaged in actual implementation of the technique due to the incompleteness of implemented devices. However, it has been also proven that QKD implemented using incomplete devices can provide complete security.

However, it is known that QKD is vulnerable to side-channel attacks using the incompleteness of devices implementing the QKD. As one solution to overcome such vulnerability, technology, such as "measurement-device-independent quantum key distribution (MDI-QKD)" showing that security is not based on the completeness of a measurement device, has been proposed and security thereof has been proven.

Since the security of MDI-QKD designed to be secure against side-channel attacks, as in the case of a basic QKD technique, assumes entity authentication, authentication is essentially required. Therefore, highly-compatible quantum entity authentication technology available for MDI-QKD is required.

Meanwhile, Korean Patent No. 10-2028098 entitled "Apparatus and Method for Authenticating using Quantum Cryptography Communication" discloses an apparatus and method for performing authentication by comparing a quantum state with a sifted key between quantum cryptography communication devices.

SUMMARY OF THE INVENTION

Accordingly, the present invention has been made keeping in mind the above problems occurring in the prior art, and an object of the present invention is to guarantee the security of quantum entity authentication even if a measurement device is exposed to an attacker or the measurement device is not trusted.

Another object of the present invention is to provide quantum entity authentication secure against a side-channel attack on a measurement device.

A further object of the present invention is to provide authentication service to MDI-QKD based on high compatibility with MDI-QKD.

In accordance with an aspect of the present invention to accomplish the above objects, there is provided a quantum entity authentication apparatus, including a quantum state preparation unit for preparing an authentication quantum state that is generated based on an authentication key previously shared with an entity; a quantum channel verification unit for transmitting information about a prestored unique operator to a corresponding entity, and for verifying security of a quantum channel by using a result of Bell measurement and the authentication quantum state, the result of the Bell measurement being revealed by the quantum measurement device; and a quantum entity authentication unit for, when the security of the quantum channel is verified, authenticating the entity using the result of the Bell measurement and the unique operator.

The quantum state preparation unit may separate the authentication quantum state into a verification state for verifying the security of the quantum channel and an authentication state for authenticating the entity.

The quantum channel verification unit may verify the security of the quantum channel depending on whether a quantum state, generated by performing the operation using the unique operator on the verification state, and a quantum state of the entity match the result of the Bell measurement.

The quantum entity authentication unit may authenticate the entity depending on whether a quantum state, generated by performing the operation using the unique operator on the authentication state, and the quantum state of the entity match the result of the Bell measurement.

The verification state may be configured such that an operation in which a Hadamard operator is included in the unique operator is performed on the verification state.

The quantum measurement device may reveal a result of Bell measurement by a detector reacting to an input quantum state, among multiple detectors, using a polarization beam splitter that receives the input quantum state.

The quantum measurement device may be configured to, when two quantum states are input, decompose the two quantum states into four Bell states, and reveal the result of the Bell measurement from which coincidence measurement events in any one detector are excluded.

The quantum channel verification unit may receive a location of the verification state from the entity and transmit information about a unique operator used to perform an operation at the location of the verification state to the entity.

The quantum entity authentication unit may receive a location of the authentication state from the entity and transmit information about the unique operator used to perform an operation at the location of the authentication state to the entity.

The entity may authenticate an additional entity that requests authentication based on the quantum state of the entity, the unique operator used to perform the operation at the location of the authentication state, the result of the Bell measurement, and the previously shared authentication key.

In accordance with another aspect of the present invention to accomplish the above objects, there is provided a quantum entity authentication method performed by a quantum entity authentication apparatus, including preparing an authentication quantum state that is generated based on an authentication key previously shared with an entity; transmitting information about a prestored unique operator to a corresponding entity, and verifying security of a quantum channel by using a result of Bell measurement and the authentication quantum state, the result of the Bell measurement being revealed by the quantum measurement device; and when the security of the quantum channel is verified, authenticating the entity using the result of the Bell measurement and the unique operator.

Preparing the authentication quantum state may be configured to separate the authentication quantum state into a verification state for verifying the security of the quantum channel and an authentication state for authenticating the entity.

Verifying the security of the quantum channel may be configured to verify the security of the quantum channel depending on whether a quantum state, generated by performing the operation using the unique operator on the verification state, and a quantum state of the entity match the result of the Bell measurement.

Authenticating the entity may be configured to authenticate the entity depending on whether a quantum state, generated by performing the operation using the unique operator on the authentication state, and the quantum state of the entity match the result of the Bell measurement.

The verification state may be configured such that an operation in which a Hadamard operator is included in the unique operator is performed on the verification state.

Verifying the security of the quantum channel may be configured such that the quantum measurement device reveals a result of Bell measurement by a detector reacting to an input quantum state, among multiple detectors, using a polarization beam splitter that receives the input quantum state.

Verifying the security of the quantum channel may be configured such that, when two quantum states are input, the quantum measurement device decomposes the two quantum states into four Bell states, and reveals the result of the Bell measurement from which coincidence measurement events in any one detector are excluded.

Verifying the security of the quantum channel may be configured to receive a location of the verification state from the entity and transmit information about a unique operator used to perform an operation at the location of the verification state to the entity.

Authenticating the entity may be configured to receive a location of the authentication state from the entity and transmit information about the unique operator used to perform an operation at the location of the authentication state to the entity.

Authenticating the entity may be configured such that the entity authenticates an additional entity that requests authentication based on the quantum state of the entity, the unique operator used to perform the operation at the location of the authentication state, the result of the Bell measurement, and the previously shared authentication key.

Authenticating the entity may be configured to, in a case where a basis of the authentication state is a predefined first basis, if the entity and the additional entity have an identical authentication state and a pair of normal measurement results is derived as the result of the Bell measurement, determine that the additional entity is intervention of an attacker.

Authenticating the entity may be configured to, if the entity and the additional entity have different authentication states and a coincidence measurement event occurs, compare dark count rates and then authenticate the additional entity.

Authenticating the entity may be configured to, in a case where a basis of the authentication state is a predetermined second basis, separate the result of the Bell measurement depending on whether the entity and the additional entity have an identical authentication state, and then authenticate the additional entity.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
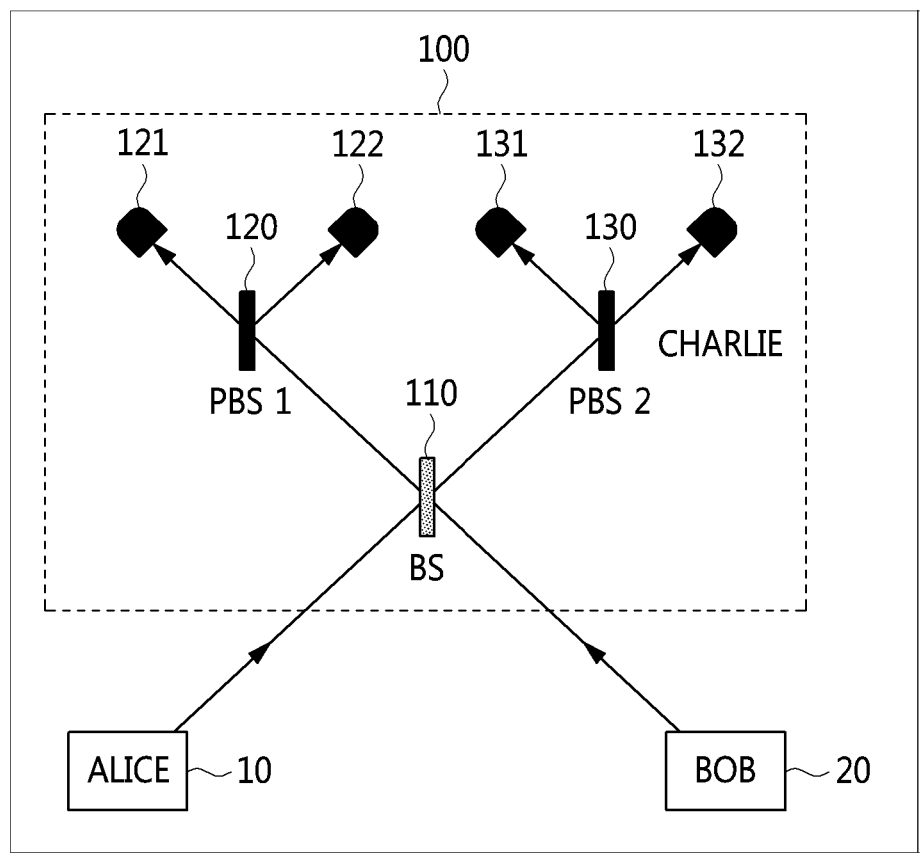
FIG. 1 is a diagram illustrating a quantum entity authentication system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the attached drawings.

Figure 2:
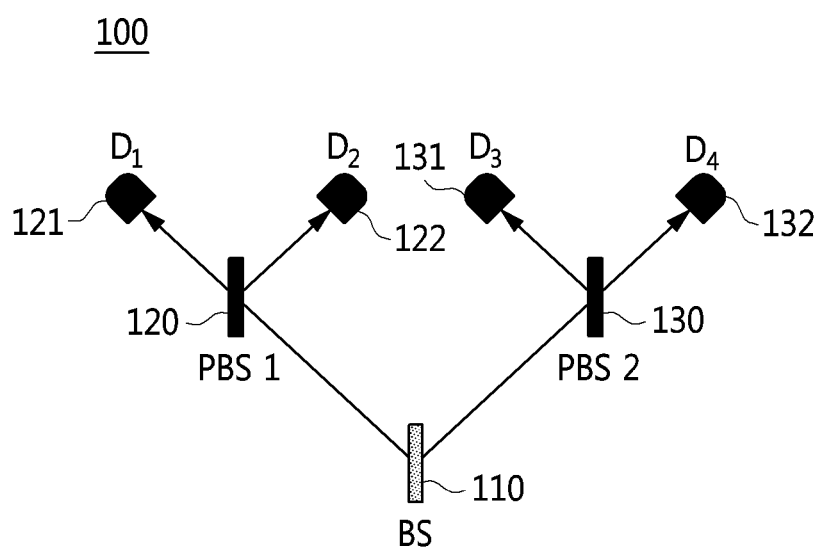
FIG. 2 is a diagram illustrating a quantum measurement device according to an embodiment of the present invention.
Figure 3:
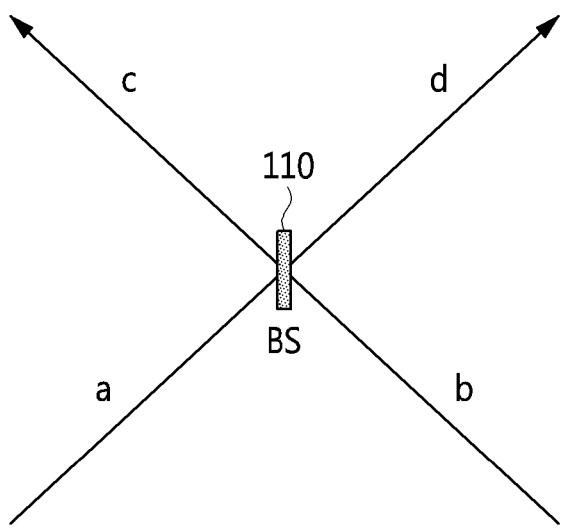
FIG. 3 is a diagram illustrating in detail a beam splitting unit illustrated in FIG. 2.
Figure 4:
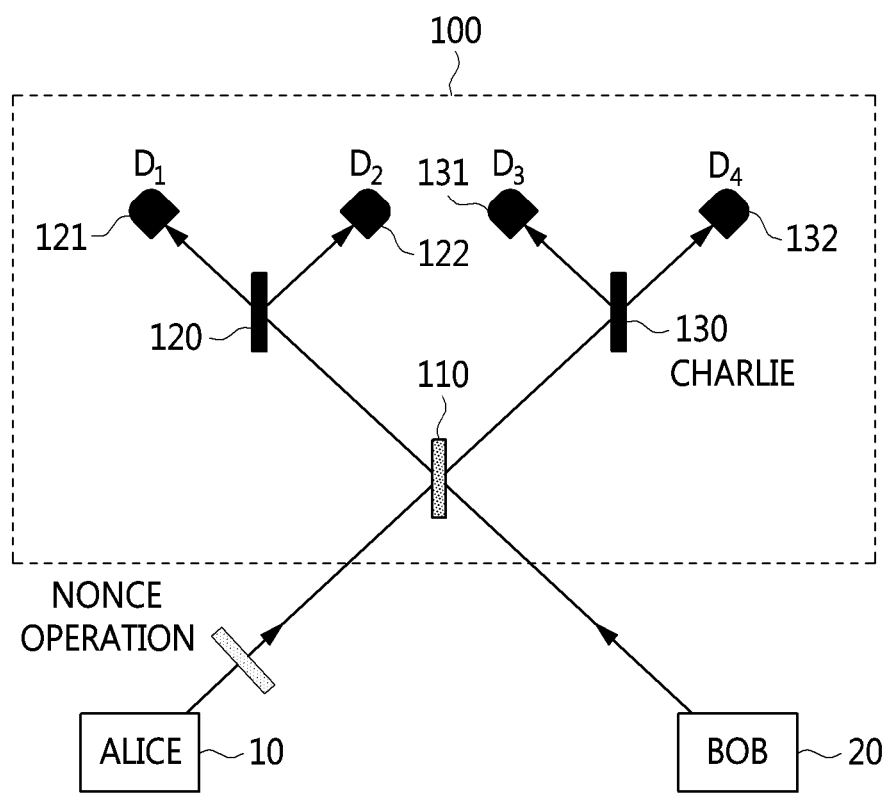
FIG. 4 is a diagram illustrating a quantum entity authentication structure according to an embodiment of the present invention.

FIG. 1 is a diagram illustrating a quantum entity authentication system according to an embodiment of the present invention. FIG. 2 is a diagram illustrating a quantum measurement device according to an embodiment of the present invention. FIG. 3 is a diagram illustrating in detail a beam splitting unit illustrated in FIG. 2. FIG. 4 is a diagram illustrating a quantum entity authentication structure according to an embodiment of the present invention.

Referring to FIG. 1, the quantum entity authentication system is illustrated.

Here, the quantum entity authentication system allows multiple entities 10 and 20 to authenticate each other based on information revealed by a quantum measurement device 100, regardless of the quantum measurement device.

As illustrated in FIG. 1, it can be seen that the entity 10 is indicated by Alice, the entity 20 is indicated by Bob, and the quantum measurement device 100 is indicated by Charlie.

The entities 10 and 20 may perform authentication therebetween according to an embodiment of the present invention.

Referring to FIG. 2, the quantum measurement device 100 according to an embodiment of the present invention may include a beam splitting unit 110, a first polarization beam splitting unit 120, and a second polarization beam splitting unit 130.

The beam splitting unit 110 may correspond to a beam splitter (BS), which may be defined as an operator $U_{BS}$ in association with the optical path of FIG. 3, and may be represented by the following Equation (1):

$$U_{BS} = \frac{1}{\sqrt{2}} \{|a\rangle\langle d| + i|a\rangle\langle c| + |b\rangle\langle c| + i|b\rangle\langle d|\} \quad (1)$$

Each of Polarization Beam Splitter 1 (PBS1), which is the first polarization beam splitting unit 120, and PBS2, which is the second polarization beam splitting unit 130, may transmit or reflect light depending on a quantum state input to the corresponding polarization beam splitter (PBS).

That is, when the input quantum state is a first quantum state $|H\rangle$, the PBS may transmit light, whereas, when the quantum state is a second quantum state $|V\rangle$, the PBS may reflect the light.

For example, when the quantum state input to the first polarization beam splitting unit 120 of FIG. 2 is $|H\rangle$, a detector $D_1$ 121 may react to the quantum state.

When two photons are simultaneously input to two different paths for BS, with one photon for each path, the detectors 121, 122, 131, and 132 of FIG. 2 may perform Bell state measurement for distinguishing quantum entangled states.

For example as illustrated in FIG. 3, the case where one of four representative Bell states, among quantum entangled states, that is, $$|\psi^+\rangle = \frac{1}{\sqrt{2}}(a_1^+ b_1^+ + a_2^+ b_2^+)|0\rangle,$$

is input to the beam splitting unit 110 will be described.

The beam splitting unit 110 may split a path for the Bell states through the operation of $U_{BS}$ in Equation (1).

The detectors $D_1$, $D_2$, $D_3$, and $D_4$ may react to the Bell states split from the polarization beam splitting units 120 and 130. All of the Bell states may be represented by the following Equation (2):

$$U_{BS}|\psi^+\rangle = U_{BS}\left[\frac{1}{\sqrt{2}}(a_1^+ b_1^+ + a_2^+ b_2^+)|0\rangle\right] \quad (2)$$
$$= U_{BS}[(ic_1^+ + d_1^+)(c_1^+ + id_1^+) + (ic_2^+ + d_2^+)(c_2^+ + id_2^+)]|0\rangle$$
$$= \frac{1}{2}i[c_1^+ c_1^+ + d_1^+ d_1^+ + c_2^+ c_2^+ + d_2^+ d_2^+]|0\rangle$$

According to Equation (2), it can be seen that the probability of two clicks on the detector $D_1$ coincidently occurring, the probability of two clicks on the detector $D_2$ coincidently occurring, the probability of two clicks on the detector $D_3$ coincidently occurring, and the probability of two clicks on the detector $D_4$ coincidently occurring are equal to each other.

Here, the case where a click on one detector coincidently occurs may be regarded as "coincidence measurement event". Since the coincidence measurement event may occur in association with an external attack or an abnormality in the corresponding detector, the results of such an event may be regarded as measurement results to be discarded in MDI-QKD. Since the coincidence measurement event cannot be distinguished from single-photon measurement and a dark count indicating detector error, it may be regarded as an event to be discarded in MDI-QKD.

The results of analysis of the remaining Bell states may be represented by the following Equations (3) to (5):

$$U_{BS}|\psi^-\rangle = U_{BS}\left[\frac{1}{\sqrt{2}}(a_1^+ b_1^+ - a_2^+ b_2^+)|0\rangle\right] \quad (3)$$
$$= \frac{1}{2}i[c_1^+ c_1^+ + d_1^+ d_1^+ - c_2^+ c_2^+ - d_2^+ d_2^+]|0\rangle$$

$$U_{BS}|\psi^+\rangle = U_{BS}\left[\frac{1}{\sqrt{2}}(a_1^+ b_2^+ + a_2^+ b_1^+)|0\rangle\right] \quad (4)$$
$$= \frac{1}{\sqrt{2}}i[c_1^+ c_2^+ + d_1^+ d_2^+]|0\rangle$$

$$U_{BS}|\psi^-\rangle = U_{BS}\left[\frac{1}{\sqrt{2}}(a_1^+ b_2^+ - a_2^+ b_1^+)|0\rangle\right] \quad (5)$$
$$= \frac{1}{\sqrt{2}}i[c_2^+ d_1^+ - c_1^+ d_2^+]|0\rangle$$

The states $|\Phi^+\rangle$ and $|\Phi^-\rangle$ cannot be used as signals because the reactions of detectors are identical to each other and the states are configured using only coincidence measurement events. In contrast, the states $|\Psi^+\rangle$ and $|\Psi^-\rangle$ can be distinguished from each other because two individual detectors react to the states at the same time without causing a coincidence measurement event, and pairs of reactions of detectors to the states differ from each other.

The relationships between Bell states and the detectors may be summarized as shown in the following Table 1.

Table 1 illustrates the relationships between Bell states and detector operations.

Referring to Table 1, it can be seen that $D_i D_i$ denotes a coincidence measurement event and is a measurement event to be discarded in MDI-QKD. Here, i={1, 2, 3, 4}. Therefore, in MDI-QKD, only the Bell states $|\Psi^+\rangle$ and $|\Psi^-\rangle$ may be used as quantum states for key generation.

TABLE 1

| Bell state | Detector operation ("," means 'or') |
|---|---|
| $|\Phi^+\rangle$ | $D_1D_1, D_2D_2, D_3D_3, D_4D_4$ |
| $|\Phi^-\rangle$ | |
| $|\Psi^+\rangle$ | $D_1D_2, D_3D_4$ |
| $|\Psi^-\rangle$ | $D_1D_3, D_2D_4$ |

Referring to Table 1, in $\sigma_z$-basis $\{|0\rangle, |1\rangle\}$ which is a first basis, when Alice and Bob prepare the same state, a key cannot be shared. The key may be shared only when states orthogonal to each other (different states) are prepared.

When $\sigma_x$-basis $\{|+\rangle,|-\rangle\}$ which is a second basis is analyzed in the above manner, a key may be shared even in the same state in addition to the orthogonal states, but a discarded event (i.e., a coincidence measurement event) may be present at a probability of 2/3.

The quantum entity authentication system may include Charlie, who performs only measurements and reveals the results of measurements, in addition to legitimate users Alice and Bob. Charlie is not a legitimate user and may be even an attacker, but Charlie should not falsify the measurement results. An authentication key, such as that shown in Equation (6), may be shared between legitimate users.

$$Ak=(Ak_1, Ak_2, \ldots, Ak_n), Ak_j \in \{00, 01, 10, 11\} \quad (6)$$

That is, the length of Ak may be 2n bits. Depending on the value of $Ak_i$, the authentication quantum states $|AQ\rangle$ generated by Alice and Bob $|AQ\rangle$ may be represented, as shown in Table 2.

Table 2 shows authentication quantum states generated depending on the authentication key.

TABLE 2

| $Ak_1$ | 00 | 01 | 10 | 11 |
|---|---|---|---|---|
| $|AQ\rangle_1$ | $|0\rangle$ | $|1\rangle$ | $|+\rangle$ | $|-\rangle$ |

Referring to FIG. 4, Alice 10 according to an embodiment of the present invention may perform entity authentication on Bob 20.

Alice and Bob may prepare authentication quantum states $|AQ\rangle$ associated with the value of Ak based on the rule of Table 2.

Bob may transmit the generated authentication quantum states to Charlie.

Before transmitting the authentication quantum states to Charlie Alice may select a unique operator N of Alice, such as that shown in Equation (7), and may transmit a quantum state, generated by applying the unique operator to the authentication quantum states, to Charlie that is the quantum measurement device 100.

$$N_i \in \{I, i\sigma_0, H\} \quad (7)$$

The unique operator N may be secret information of Alice.

Alice may perform an operation using the unique operator by separating a verification location at which the security of a quantum channel is to be tested and an authentication location at which a quantum state is to be used as an authentication signal when the operation using the unique operator is performed.

Alice may randomly select a verification state and an authentication state from among the authentication quantum states. A component ratio of the verification states and the authentication states may be determined in association with the performance of a quantum channel. Unlike in the verification states, in the authentication states, a Hadamard operator H, among unique operators, may not be performed. Here, H may provide the effect of mutually converting $\sigma_z$-basis and $\delta_x$-basis. A matrix representation of H and the relationships between H and quantum states may be represented by the following Equations (8) and (9).

$$H = \frac{1}{\sqrt{2}}\begin{pmatrix} 1 & 1 \\ 1 & -1 \end{pmatrix} \quad (8)$$

$H|0\rangle = |+\rangle$ $H|1\rangle = |-\rangle$ $H|+\rangle = |0\rangle$ $H|-\rangle = |1\rangle \quad (9)$ The unique operator in Equation (7) may be randomly applied to the verification states.

Charlie may perform Bell measurement using the Bell state measurement structure of FIG. 2, and may reveal the results of the Bell measurement.

Alice may determine whether the verification locations of the verification states satisfy the relational expression of Table 3 so as to verify the security of the quantum channel. If it is determined that the quantum channel is secure as a result of the determination, the process may proceed to a subsequent step, whereas if it is determined that the quantum channel is not secure, authentication quantum states may be newly prepared, and then a quantum channel may be reset.

Alice may authenticate Bob based on the relationship of Table 3 using the results of measurement by Charlie and information about the unique operator N selected and applied by Alice. $(D_i, D_i)$ denotes a coincidence measurement event, and may be a measurement event to be discarded in MDI-QKD.

TABLE 3

| Quantum state of Alice* and Bob before measurement (* the quantum state of Alice is a state after the unique operator has been applied) | Detector measurement results |
|---|---|
| $(|0\rangle, |0\rangle)$ | $(D_1,D_1)(D_4,D_4)$ |
| $(|1\rangle, |1\rangle)$ | $(D_2,D_2)(D_3,D_3)$ |
| $(|0\rangle, |1\rangle), (|1\rangle, |0\rangle)$ | $(D_1,D_2)(D_3,D_4)(D_1,D_3)(D_2,D_4)$ |
| $(|+\rangle, |-\rangle), (|-\rangle, |+\rangle)$ | $(D_1,D_1)(D_2,D_2)(D_3,D_3)(D_4,D_4)$ |
|  | $(D_1,D_3)(D_2,D_4)$ |
| $(|+\rangle, |+\rangle), (|-\rangle, |-\rangle)$ | $(D_1,D_1)(D_2,D_2)(D_3,D_3)(D_4,D_4)(D_1,D_2)$ |
|  | $(D_3,D_4)$ |
| $(|+\rangle, |0\rangle), (|0\rangle, |+\rangle) (|-\rangle, |0\rangle),$ | $(D_1,D_1)(D_4,D_4)$ |
| $(|0\rangle, |-\rangle)$ | $(D_1,D_2)(D_3,D_4)(D_1,D_3)(D_2,D_4)$ |
| $(|+\rangle, |1\rangle), (|1\rangle, |+\rangle) (|-\rangle, |1\rangle),$ | $(D_2,D_2)(D_3,D_3)$ |
| $(|1\rangle, |-\rangle)$ | $(D_1,D_2)(D_3,D_4)(D_1,D_3)(D_2,D_4)$ |

In this case, Bob 20, who is an entity according to an embodiment of the present invention, may perform entity authentication on Alice 10, who is an another entity.

Bob 20 may have the same structure as Alice 10, and may perform the same function as Alice 10.

Alice 10 may prepare the authentication quantum states $|AQ\rangle$ depending on the value of Ak.

Bob may prepare the authentication quantum states by separating a verification state for verifying the security of the quantum channel and an authentication state for authentication. The verification state may be configured by randomly selecting one from among $\{|0\rangle, |1\rangle, |+\rangle, |-\rangle\}$ without association with $|AQ\rangle$. In the authentication state, a quantum state may be randomly prepared, with a basis being maintained. That is, when $Ak_i$ is 00 (or 01), the quantum state $|AQ\rangle_i$ prepared by Bob, may be one of $|0\rangle$ and $|1\rangle$. When $Ak_i$ is 10 (or 11), the quantum state $|AQ\rangle_i$ prepared by Bob, may be one of $|+\rangle$ and $|-\rangle$.

In detail, examples of the state prepared by Alice and Bob may be shown in the following Table 4.

TABLE 4

| Ak | 01 | 10 | 11 | 00 | 11 | 00 | 01 | 11 | 10 | 01 | 00 | 01 | 10 | 11 |
|---|---|---|---|---|---|---|---|---|---|---|---|---|---|---|
| State prepared by Alice (before application of unique operator) | \|1> | \|+> | \|-> | \|0> | \|-> | \|0> | \|1> | \|-> | \|+> | \|1> | \|0> | \|1> | \|+> | \|-> |
| State prepared by Bob | \|1> | \|-> | \|-> | \|+> | \|-> | \|1> | \|0> | \|1> | \|+> | \|0> | \|0> | \|1> | \|0> | \|+> |

Alice may prepare the quantum state depending on Ak.

Bob may randomly configure a quantum state within the same basis based on Ak with respect to authentication states other than the verification state, and may configure a quantum state by randomly selecting one from among {|0>,|1>, |+>,|->} regardless of the basis, with respect to the verification state.

Alice may configure the authentication state from the authentication quantum states and randomly selects a unique operator N', such as that shown in Equation (10). Then Alice may apply the selected unique operator to the authentication states.

$$N'=\{I, i\sigma_0\} \quad (10)$$

From the authentication quantum states, the verification state may be configured by randomly selecting the unique operator N, such as that shown in Equation (7), and applying the selected unique operator to the authentication quantum states.

Alice may transmit the quantum state to which the unique operator has been applied to Charlie.

Charlie may perform Bell measurement on the quantum states received from Alice and Bob, and may reveal the results of the Bell measurement.

Bob may notify Alice of the location of the verification state, request Alice to reveal the unique operator N used to perform the operation at the corresponding location, and receive information about the unique operator N from Alice.

Bob may test the security of the corresponding channel by checking whether the results of measurement revealed by Charlie, the unique operator N revealed by Alice, and the quantum state transmitted by Bob to Charlie are associated with each other with reference to Table 3.

Bob may proceed to a subsequent step if it is determined that the quantum channel is secure, otherwise Bob may reprepare authentication quantum states and reset a quantum channel.

Bob may request Alice to reveal the unique operator N' for the authentication states (i.e., states other than the previously revealed verification state), and may acquire information about the unique operator N' from Alice.

Bob may authenticate Alice by comparing the states prepared by Bob, N' revealed by Alice for the authentication states, the results of Bell measurement revealed by Charlie, and the previously shared authentication key Ak and then checking whether the relationships of Table 3 are satisfied.

Figure 5:
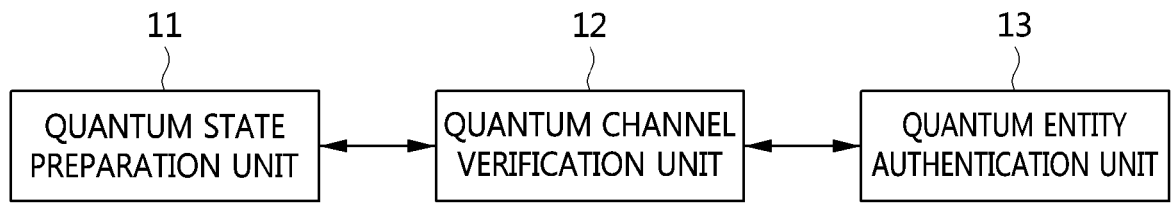
FIG. 5 is a block diagram illustrating a quantum entity authentication apparatus according to an embodiment of the present invention.

FIG. 5 is a block diagram illustrating a quantum entity authentication apparatus according to an embodiment of the present invention.

Referring to FIG. 5, Alice 10 according to an embodiment of the present invention includes a quantum state preparation unit 11, a quantum channel verification unit 12, and a quantum entity authentication unit 13.

The quantum state preparation unit 11 may prepare authentication quantum states that are generated based on an authentication key previously shared with an entity.

Here, the quantum state preparation unit 11 may separate the authentication quantum states into a verification state for verifying the security of a quantum channel and an authentication state for authenticating the entity.

The quantum channel verification unit 12 may transmit a quantum state, generated by performing an operation using a prestored unique operator on the authentication quantum states, to a quantum measurement device, and may verify the security of the quantum channel by using the results of Bell measurement, revealed by the quantum measurement device for the quantum state, and the authentication quantum states.

In detail, the quantum channel verification unit 12 may verify the security of the quantum channel depending on whether the quantum state, generated by performing the operation using the unique operator on the verification state, and the quantum state of the entity match the results of the Bell measurement.

Here, the verification state may be obtained by performing an operation using an operator in which a Hadamard operator is included in the unique operator.

The quantum measurement device 100 may reveal the results of Bell measurement by a detector reacting to the input quantum state, among multiple detectors, using a polarization beam splitter which receives the input quantum state.

Here, when two quantum states are input, the quantum measurement device 100 may decompose the two quantum states into four Bell states, and may reveal the Bell measurement results from which coincidence measurement events in any one detector are excluded.

The quantum channel verification unit 12 may receive the location of the verification state from the entity, and may transmit information about the unique operator used to perform the operation at the location of the verification state to the entity.

When the security of the quantum channel is verified, the quantum entity authentication unit 13 may authenticate the entity using the results of the Bell measurement and the unique operator.

Here, the quantum entity authentication unit 13 may authenticate the entity depending on whether a quantum state, generated by performing an operation using the unique operator on the authentication state, and the quantum state of the entity match the results of the Bell measurement.

The quantum entity authentication unit 13 may receive the location of the authentication state from the entity, and may transmit information about the unique operator used to perform the operation at the location of the authentication state to the entity.

The corresponding entity may authenticate an additional entity that has requested authentication using the quantum state of the entity, the unique operator used for the operation at the location of the authentication state, the results of the Bell measurement, and the previously shared authentication key.

When the basis of the authentication state is a predefined first basis, if the authentication states of the corresponding entity and the additional entity are identical to each other, and a pair of normal measurement results is derived as the results of the Bell measurement, the quantum entity authentication unit 13 may determine that the additional entity is the intervention of an attacker.

Further, when the authentication states of the corresponding entity and the additional entity are different from each other and a coincidence measurement event has occurred, the quantum entity authentication unit 13 may authenticate the additional entity by comparing dark count rates.

Here, when the basis of the authentication state is a predefined second basis, the quantum entity authentication unit 13 may authenticate the additional entity by separating the results of the Bell measurement depending on whether the authentication states of the entity and the additional entity are identical to each other.

Figure 6:
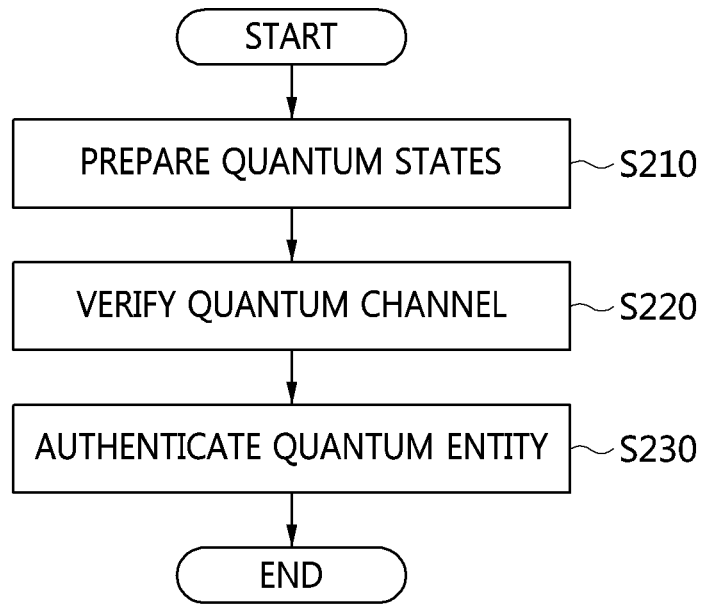
FIG. 6 is an operation flowchart illustrating a quantum entity authentication method according to an embodiment of the present invention.

FIG. 6 is an operation flowchart illustrating a quantum entity authentication method according to an embodiment of the present invention.

Referring to FIG. 6, the quantum entity authentication method according to the embodiment of the present invention may prepare quantum states at step S210.

That is, at step S210, authentication quantum states that are generated based on an authentication key previously shared with an entity and may be prepared.

At step S210, the authentication quantum states may be separated into a verification state for verifying the security of a quantum channel and an authentication state for authenticating the entity.

Here, among the authentication quantum states, the authentication state may be obtained by performing an operation using a unique operator N'.

Among the authentication quantum states, the verification state may be obtained by performing an operation using an operator N in which a Hadamard operator is included in the unique operator.

Next, the quantum entity authentication method according to an embodiment of the present invention may verify the quantum channel at step S220.

In detail, at step S220, a quantum state, generated by performing an operation using a prestored unique operator on the authentication quantum states, may be transmitted to a quantum measurement device, and the security of the quantum channel may be verified by using the results of the Bell measurement revealed by the quantum measurement device for the quantum state, the authentication quantum states, and the unique operator.

Here, at step S220, the security of the quantum channel may be verified depending on whether the quantum state, generated by performing the operation using the unique operator on the verification state, and the quantum state of the entity match the results of the Bell measurement.

Here, at step S220, the quantum measurement device 100 may reveal the results of Bell measurement by a detector which reacts to the input quantum state, among multiple detectors, using a polarization beam splitter which receives the input quantum state.

Here, at step S220, when two quantum states are input to the quantum measurement device 100, the two quantum states may be decomposed into four Bell states, and thus the Bell measurement results from which coincidence measurement events are excluded may be revealed.

Further, at step S220, the location of the verification state may be received from the entity, and information about the unique operator used to perform the operation at the location of the verification state may be transmitted to the entity.

Next, the quantum entity authentication method according to an embodiment of the present invention may authenticate the entity at step S230.

That is, at step S230, when the security of the quantum channel is verified, the entity may be authenticated using the results of the Bell measurement and the unique operator.

Here, at step S230, the entity may be authenticated depending on whether a quantum state, generated by performing an operation using the unique operator on the authentication state, and the quantum state of the entity match the results of the Bell measurement.

Here, at step S230, the location of the authentication state may be received from the entity, and information about the unique operator used to perform the operation at the location of the authentication state may be transmitted to the entity.

At step S230, the corresponding entity may authenticate an additional entity that has requested authentication using the quantum state of the entity, the unique operator used for the operation at the location of the authentication state, the results of the Bell measurement, and the previously shared authentication key.

At step S230, when the basis of the authentication state is a predefined first basis, if the authentication states of the corresponding entity and the additional entity are identical to each other, and a pair of normal measurement results is derived as the results of the Bell measurement, it may be determined that the additional entity is the intervention of an attacker.

Here, at step S230, when the authentication states of the corresponding entity and the additional entity are different from each other and a coincidence measurement event has occurred, the additional entity may be authenticated by comparing dark count rates.

Further, at step S230, when the basis of the authentication state is a predefined second basis, the additional entity may be authenticated by separating the results of the Bell measurement depending on whether the authentication states of the entity and the additional entity are identical to each other.

Below, an example in which the quantum entity authentication apparatus according to the embodiment of the present invention and an entity authenticate an additional entity will be described.

First, an example in which Alice 10 according to an embodiment of the present invention performs entity authentication on Bob 20 will be described.

Assuming that an authentication key is $Ak_i=10$, Alice and Bob may prepare quantum states $|AQ\rangle_i^A=|+\rangle$ and $|AQ\rangle_i^B=|+\rangle$, respectively, depending on $Ak_i$. The superscripts of A and B indicate states prepared by Alice and Bob, respectively.

In this case, Alice selects a unique operator $N'=i\sigma_y$, and performs an operation using the unique operator, as represented by the following Equation (11):

$$N_i|AQ\rangle_i^B=|-\rangle-|AQ\rangle_i^B, \quad (11)$$

At this time, Alice may transmit a quantum state obtained by performing the operation using the unique operator to Charlie.

Here, it can be seen that the quantum states received by Charlie are quantum states $|AQ\rangle_i^A=|+\rangle$ and $|AQ\rangle_i^{B'}=|-\rangle$. Therefore, referring to Table 3, the results of measurement by Charlie may be one of $\{(D_1,D_1)\,(D_2,D_2)\,(D_3,D_3)\,(D_4,D_4)\,(D_1,D_3)\,(D_2,D_4)\}$, but, in practice, the measurement results may be one of $\{(D_1,D_3)\,(D_2,D_4)\}$ with the exception of coincidence measurement events. The probability of a coincidence measurement event occurring (the probability of failure in measurement) may be 50%, and $(D_1,D_3)$ or $(D_2,D_4)$ may appear at the probability of the remaining 50%. This may be summarized, as shown in the following Table 5.

TABLE 5

| Input quantum states of Alice and Bob | Possible measurement results of Charlie | Results of measurement indicating success in authentication | Probability of success in authentication |
|---|---|---|---|
| ($\|0>$, $\|0>$) | ($D_1,D_1$)($D_4,D_4$) | — | — |
| ($\|1>$, $\|1>$) | ($D_2,D_2$)($D_3,D_3$) | — | — |
| ($\|0>$, $\|1>$), ($\|1>$, $\|0>$) | ($D_1,D_2$)($D_3,D_4$) ($D_1,D_3$)($D_2,D_4$) | ($D_1,D_2$)($D_3,D_4$) ($D_1,D_3$)($D_2,D_4$) | 100% |
| ($\|+>$, $\|+>$), ($\|->$, $\|->$) | ($D_1,D_1$)($D_2,D_2$) ($D_3,D_3$)($D_4,D_4$) ($D_1,D_2$)($D_3,D_4$) | ($D_1,D_2$)($D_3,D_4$) | 50% |
| ($\|+>$, $\|->$), ($\|->$, $\|+>$) | ($D_1,D_1$)($D_2,D_2$) ($D_3,D_3$)($D_4,D_4$) ($D_1,D_3$)($D_2,D_4$) | ($D_1,D_3$)($D_2,D_4$) | 50% |

When the input states of Alice and Bob are ($|0>,|0>$) or ($|1>,|1>$), only coincidence measurement events must occur. Accordingly, when the results of measurement, such as ($D_1,D_2$), ($D_3,D_4$), ($D_1,D_3$), or ($D_2,D_4$), appear, it may be determined that there is an authentication attempt made by a middle attacker or an illegitimate user. Referring to Table 5, it can be seen that, when input states are equivalently distributed, the total probability of success in authentication is 50%.

Next, an example in which Bob 20, who is an entity according to an embodiment of the present invention, performs entity authentication on Alice 10, who is an additional entity, will be described.

For example, it may be assumed that the value of an authentication key $Ak_j$ at location j of an authentication state is "00", and the authentication state prepared by Bob depending on the value of the authentication key is $|0>$.

At this time, Alice may prepare $|0>$ depending on $Ak_j$ and perform an operation using a unique operator $N'=i\sigma_y$ on the authentication state prepared by Alice, and may then transmit $|1>$ to Charlie.

In this case, when the result of measurement by Charlie is ($D_3,D_4$), Bob may request Alice to reveal the unique operator N' at the location of the authentication state.

Then, Bob may check whether the unique operator revealed by Alice satisfies the associative relationship, such as that shown in Table 5, together with the results of measurement by Charlie, the value of the authentication key $Ak_j$, and the initial state prepared by Bob, and may then authenticate Alice.

Since ($D_3,D_4$) revealed by Charlie and the unique operator $N'=i\sigma_y$ revealed by Alice satisfy the relationship of Table 5, Bob may successfully perform entity authentication on Alice.

When the basis of authentication states is a predefined first basis $\sigma_z$, the entity Alice 10 may analyze the authentication states by separating the cases of the authentication state into two cases.

First, the case where two authentication states are identical to each other is taken into consideration. In this case, when a pair of normal measurement results appears, Alice 10 may determine that there is the intervention of an attacker. Second, the case where two authentication states are different from each other is taken into consideration. The number of cases (coincidence measurement events may be included in the cases) where only one detector reacts to the input state for which only pairs of normal measurement results must appear is statistically analyzed. Authentication may succeed only when the number of cases is lower than a dark count rate, otherwise it may be determined that there is the intervention of an attacker.

When the basis of the authentication state is a predefined second basis $\sigma_x$, pairs of normal measurement results may be separated without overlapping each other, and thus Alice 10 may easily determine whether authentication has succeeded.

Since a verifier according to an embodiment of the present invention randomly prepares verification states and authentication states, an external attacker and a prover cannot make an attack by separating the verification states and the authentication states. In the results of measurement revealed by Charlie, the quantum measurement device 100, the authentication states and the verification states are not separated from each other, and thus it is possible to allow the verifier to determine whether the security of a channel is guaranteed and a middle attacker is present without leaking authentication information.

When the verifier is Alice 10, Alice 10 may be aware that a verification state prepared by Bob 20, who is the prover, uses a shared authentication key Ak. Therefore, Alice 10, who is the verifier, may check whether the results of measurement revealed by Charlie and the state prepared by the verifier satisfy the relationship of Table 3, thus determining the security of the channel. However, when the verifier is Bob, Bob may check whether the relationship of Table 3 is satisfied only by requesting information about the unique operator N related to a verification location from Alice, who is the prover, and by receiving the requested information.

In this case, error in detectors and a coincidence measurement event rate γ determined to be error due to difficulty in identifying a normal measurement may be represented by the following Equation (12):

$$\gamma \equiv \frac{1}{2} + u \qquad (12)$$

Here, u denotes dark count rates indicating the error in detectors. u may be experimentally specified. In actual operations, when the total coincidence measurement event rate is calculated and is compared with a theoretical coincidence measurement event rate γ, the existence of a middle attacker or an internal attacker may be identified.

With the exception of coincidence measurement events according to an embodiment of the present invention, all measurement results available for verification may be defined as a total of $$\frac{1}{2} - u + \delta$$

for all inputs. Here, δ denotes the probability that two different detectors will be measured at the same time due to dark counts, and pairs of normal measurement results (($D_1,D_2$), ($D_3,D_4$), ($D_1,D_3$), or ($D_2,D_4$)) will be obtained. Since the probability δ that normal measurement result pairs will be obtained by dark counts have a relationship of 1»u»δ, δ may be negligible. Therefore, from the standpoint of security, the probability δ of occurrence of normal measurement result pairs attributable to errors is negligible.

A verification probability indicating the probability that an attacker will be identified in the verification state may be represented by Equation (13).

$$D=(1-\gamma)^l \qquad (13)$$

In Equation 13, l denotes the number of verification states. According to Equation (13), γ<1 is satisfied, so that, when the number of verification states 1 is sufficiently large, D converges on '1', thus enabling an attacker to be definitely detected.

Figure 7:
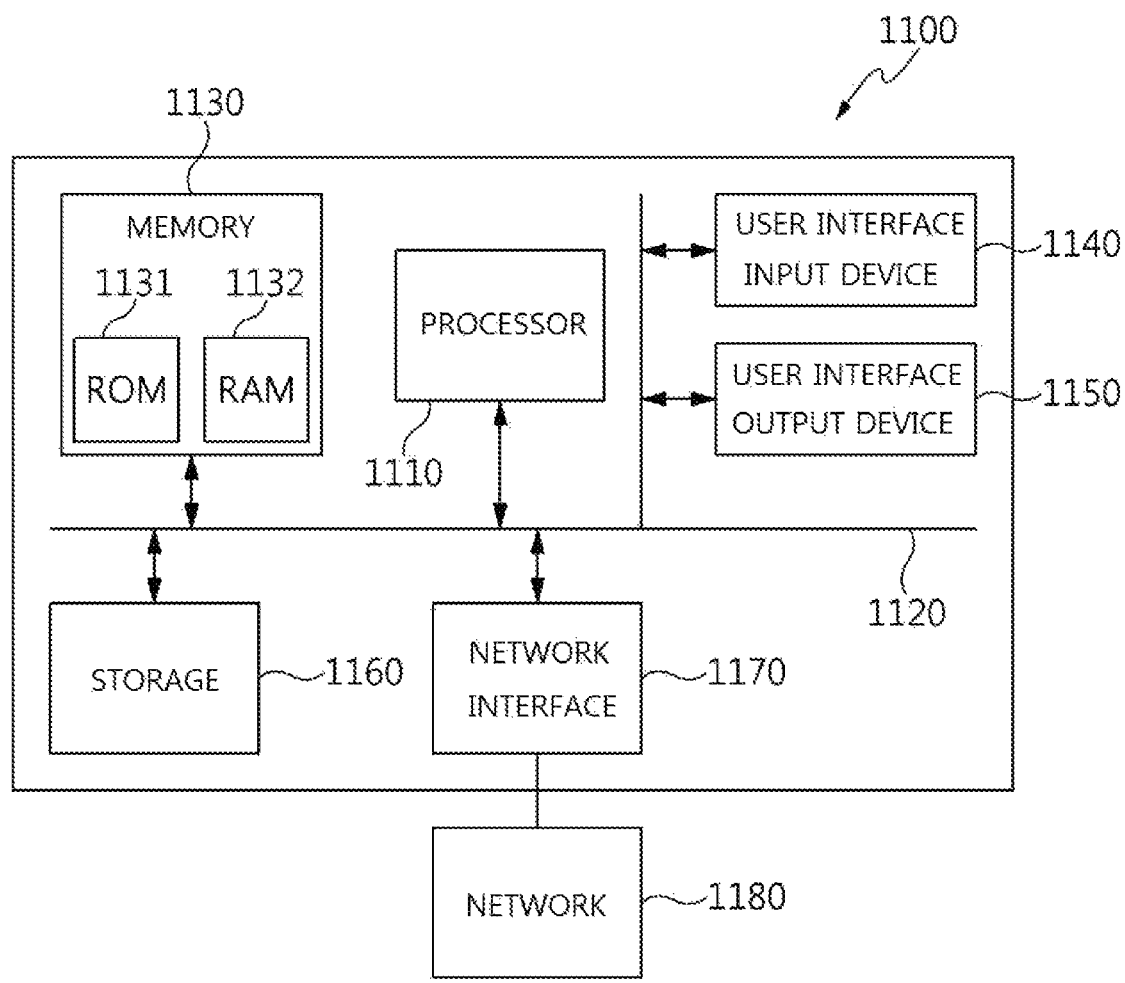
FIG. 7 is a diagram illustrating a computer system according to an embodiment of the present invention.

FIG. 7 is a diagram illustrating a computer system according to an embodiment of the present invention.

Referring to FIG. 7, each of Alice 10 and the quantum measurement device 100 according to an embodiment of the present invention may be implemented in a computer system 1100, such as a computer-readable storage medium. As illustrated in FIG. 7, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The quantum entity authentication apparatus according to an embodiment of the present invention may include one or more processors, and execution memory 1130 for storing at least one program that is executed by the one or more processors 1110, wherein the at least one program is configured to prepare an authentication quantum state that is generated based on an authentication key previously shared with an entity, transmit a quantum state, generated by performing an operation using a prestored unique operator on the authentication quantum state, to a quantum measurement device, and verify security of a quantum channel by using a result of Bell measurement and the authentication quantum state, the result of Bell measurement being revealed by the quantum measurement device for the quantum state, and when security of the quantum channel is verified, authenticate the entity using the result of the Bell measurement and the unique operator.

The at least one program is configured to separate the authentication quantum state into a verification state for verifying the security of the quantum channel and an authentication state for authenticating the entity.

Here, the verification state may be configured such that an operation in which a Hadamard operator is included in the unique operator is performed on the verification state.

The at least one program may be configured to verify the security of the quantum channel depending on whether a quantum state, generated by performing the operation using the unique operator on the verification state, and a quantum state of the entity match the result of the Bell measurement.

Here, the quantum measurement device may reveal a result of Bell measurement by a detector reacting to an input quantum state, among multiple detectors, using a polarization beam splitter that receives the input quantum state.

Here, when two quantum states are input, the quantum measurement device may decompose the two quantum states into four Bell states, and may reveal the result of the Bell measurement from which coincidence measurement events in multiple detectors are excluded.

The at least one program is configured to receive a location of the verification state from the entity and transmit information about a unique operator used to perform an operation at the location of the verification state to the entity.

The at least one program is configured to authenticate the entity depending on whether a quantum state, generated by performing the operation using the unique operator on the authentication state, and the quantum state of the entity match the result of the Bell measurement.

The at least one program is configured to receive a location of the authentication state from the entity and transmit information about the unique operator used to perform an operation at the location of the authentication state to the entity.

The at least one program is configured such that the entity authenticates an additional entity that requests authentication based on the quantum state of the entity, the unique operator used to perform the operation at the location of the authentication state, the result of the Bell measurement, and the previously shared authentication key.

The at least one program is configured to, in a case where a basis of the authentication state is a predefined first basis, if the entity and the additional entity have an identical authentication state and a pair of normal measurement results is derived as the result of the Bell measurement, determine that the additional entity is intervention of an attacker.

The at least one program is configured to, if the entity and the additional entity have different authentication states and a coincidence measurement event occurs, compare dark count rates and then authenticate the additional entity.

The at least one program is configured to, in a case where a basis of the authentication state is a predetermined second basis, separate the result of the Bell measurement depending on whether the entity and the additional entity have an identical authentication state, and then authenticate the additional entity.

The present invention may guarantee the security of quantum entity authentication even if a measurement device is exposed to an attacker or the measurement device is not trusted.

Further, the present invention may provide quantum entity authentication secure against a side-channel attack on a measurement device.

Furthermore, the present invention may provide authentication service to MDI-QKD based on high compatibility with MDI-QKD.

As described above, in the quantum entity authentication apparatus and method according to the present invention, the configurations and schemes in the above-described embodiments are not limitedly applied, and some or all of the above embodiments can be selectively combined and configured so that various modifications are possible.

What is claimed is:

1. A quantum entity authentication apparatus of a first entity, comprising:
at least one processor; and memory having instructions stored thereon, which, when executed by the at least one processor, cause the at least one processor to function as:
a quantum state preparation unit for preparing an authentication quantum state that is generated based on an authentication key previously shared with a second entity;
a quantum channel verification unit for transmitting a quantum state, generated by performing an operation using a prestored unique operator on the authentication quantum state, to a quantum measurement device, and for verifying security of a quantum channel by using a result of Bell measurement and the authentication quantum state, the result of the Bell measurement being revealed by the quantum measurement device for the quantum state; and a quantum entity authentication unit for, when the security of the quantum channel is verified, authenticating the second entity using the result of the Bell measurement and the unique operator, wherein the quantum state preparation unit separates the authentication quantum state into a verification state for verifying the security of the quantum channel and an authentication state for authenticating the second entity, wherein the quantum channel verification unit verifies the security of the quantum channel depending on whether a quantum state, generated by performing the operation using the unique operator on the verification state, and a quantum state of the second entity match the result of the Bell measurement, wherein the quantum entity authentication unit authenticates the second entity depending on whether a quantum state, generated by performing the operation using the unique operator on the authentication state, and the quantum state of the second entity match the result of the Bell measurement.

2. The quantum entity authentication apparatus of claim 1, wherein the verification state is configured such that an operation in which a Hadamard operator is included in the unique operator is performed on the verification state.

3. The quantum entity authentication apparatus of claim 1, wherein the quantum measurement device reveals a result of Bell measurement by a detector reacting to an input quantum state, among multiple detectors, using a polarization beam splitter that receives the input quantum state.

4. The quantum entity authentication apparatus of claim 3, wherein the quantum measurement device is configured to, when two quantum states are input, decompose the two quantum states into four Bell states, and reveal the result of the Bell measurement from which coincidence measurement events in any one detector are excluded.

5. The quantum entity authentication apparatus of claim 1, wherein the quantum channel verification unit receives a location of the verification state from the second entity and transmits information about a unique operator used to perform an operation at the location of the verification state to the second entity.

6. The quantum entity authentication apparatus of claim 5, wherein the quantum entity authentication unit receives a location of the authentication state from the second entity and transmits information about the unique operator used to perform an operation at the location of the authentication state to the second entity.

7. The quantum entity authentication apparatus of claim 6, wherein the second entity authenticates an additional entity that requests authentication based on the quantum state of the second entity, the unique operator used to perform the operation at the location of the authentication state, the result of the Bell measurement, and the previously shared authentication key.

8. A quantum entity authentication method performed by a quantum entity authentication apparatus of a first entity, the quantum entity authentication method comprising:

preparing an authentication quantum state that is generated based on an authentication key previously shared with a second entity;

transmitting a quantum state, generated by performing an operation using a prestored unique operator on the authentication quantum state, to a quantum measurement device, and verifying security of a quantum channel by using a result of Bell measurement and the authentication quantum state, the result of the Bell measurement being revealed by the quantum measurement device for the quantum state; and when the security of the quantum channel is verified, authenticating the second entity using the result of the Bell measurement and the unique operator, wherein preparing the authentication quantum state is configured to separate the authentication quantum state into a verification state for verifying the security of the quantum channel and an authentication state for authenticating the second entity, wherein verifying the security of the quantum channel is configured to verify the security of the quantum channel depending on whether a quantum state, generated by performing the operation using the unique operator on the verification state, and a quantum state of the second entity match the result of the Bell measurement, wherein authenticating the second entity is configured to authenticate the second entity depending on whether a quantum state, generated by performing the operation using the unique operator on the authentication state, and the quantum state of the second entity match the result of the Bell measurement.

9. The quantum entity authentication method of claim 8, wherein the verification state is configured such that an operation in which a Hadamard operator is included in the unique operator is performed on the verification state.

10. The quantum entity authentication method of claim 8, wherein verifying the security of the quantum channel is configured such that the quantum measurement device reveals a result of Bell measurement by a detector reacting to an input quantum state, among multiple detectors, using a polarization beam splitter that receives the input quantum state.

11. The quantum entity authentication method of claim 10, wherein verifying the security of the quantum channel is configured to, when two quantum states are input to the quantum measurement device, decompose the two quantum states into four Bell states and reveal the result of the Bell measurement from which coincidence measurement events in multiple detectors are excluded.

12. The quantum entity authentication method of claim 8, wherein verifying the security of the quantum channel is configured to receive a location of the verification state from the second entity and transmit information about a unique operator used to perform an operation at the location of the verification state to the second entity.

13. The quantum entity authentication method of claim 12, wherein authenticating the second entity is configured to receive a location of the authentication state from the second entity and transmit information about the unique operator used to perform an operation at the location of the authentication state to the second entity.

14. The quantum entity authentication method of claim 13, wherein authenticating the second entity is configured such that the second entity authenticates an additional entity that requests authentication based on the quantum state of the second entity, the unique operator used to perform the operation at the location of the authentication state, the result of the Bell measurement, and the previously shared authentication key.

15. The quantum entity authentication method of claim 14, wherein authenticating the second entity is configured to, in a case where a basis of the authentication state is a predefined first basis, if the second entity and the additional entity have an identical authentication state and a pair of normal measurement results is derived as the result of the Bell measurement, determine that the additional entity is intervention of an attacker.

16. The quantum entity authentication method of claim 15, wherein authenticating the second entity is configured to, if the second entity and the additional entity have different authentication states and a coincidence measurement event occurs, compare dark count rates and then authenticate the additional entity.

17. The quantum entity authentication method of claim 14, wherein authenticating the second entity is configured to, in a case where a basis of the authentication state is a predetermined second basis, separate the result of the Bell measurement depending on whether the second entity and the additional entity have an identical authentication state, and then authenticate the additional entity.

* * * * *